3,261,818
CROSS-LINKING POLYMERS
Arnold F. Marcantonio, Wilmington, Del., assignor to Hercules Incorporated, a corporation of Delaware
No Drawing. Filed Mar. 29, 1963, Ser. No. 269,196
11 Claims. (Cl. 260—85.1)

This invention relates to cross-linking hydrocarbon polymers. More particularly, the invention relates to cross-linking hydrocarbon polymers with aromatic polyazides at room temperatures in the presence of Lewis acids.

In the past, industry has depended almost entirely on sulfur, sulfur-bearing materials or organic peroxides as vulcanizing, i.e., cross-linking, agents. However, these agents suffer the drawback that, because of their mode of action, they are not equally effective in cross-linking all types of hydrocarbon polymers. For example, polybutadiene is effectively vulcanized by peroxides, while crystalline polypropylene is not. It has more recently been discovered that hydrocarbon polymers can be cross-linked when heated or subjected to irradiation in the presence of aromatic polyazides. However, this process is costly and some hydrocarbon polymers are adversely affected by extended periods of heat or strong irradiation.

Now, in accordance with this invention, it has unexpectedly been found that hydrocarbon polymers can be rapidly cross-linked at room temperature under ordinary light conditions when aromatic polyazides are used in the presence of non-protonating Lewis acids. The resulting vulcanizates are solvent resistant and odor free.

Accordingly, the present invention relates to a process for cross-linking a hydrocarbon polymer which comprises treating said polymer with an aromatic polyazide having the formula $R(N_3)_x$ where R is an aromatic grouping inert to the cross-linking reaction and $x$ is an integer greater than 1 in the presence of a non-protonating Lewis acid at a temperature below about 75° C., most preferably from about 0° C. to about 50° C.

The aromatic polyazides useful in the present invention have the general formula $R(N_3)_x$ where R is an aromatic grouping inert to the cross-linking reaction and $x$ is an integer greater than 1. Preferably $x$ will be an integer from 2 to 100 and R will be selected from the group of organic radicals consisting of arylene and alkarylene radicals. Exemplary of the aromatic polyazides useful in this invention are m-phenylene diazide, 2,4,6-triazidobenzene, 4,4'-diphenyl diazide, 4,4'-diphenylmethane diazide, 4,4'-diazidodiphenylamine, 4,4'-diazidodiphenylsulfone, 2,2'-dinitro-4,4'-diazidodiphenyl, 2,7-diazidonaphthalene, 2,6-diazidoanthraquinone, etc. It will, of course, be obvious to those skilled in the art that still other aromatic polyazides containing functional groups, which are inert to cross-linking reactions, such as halogen, ester, azo, aldoxime, nitro, etc., groups, are included in the above definition. These functional groups will preferably be meta or para to the azido group so as not to hinder cross-linking activity.

The aromatic polyazides can be prepared in various ways as, for example, by diazotizing the corresponding aromatic amine and treating it with hydrazoic acid. The reaction can be shown by the following equation:

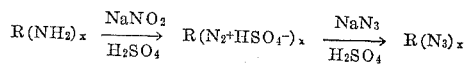

where R and $x$ are as defined above. The aromatic amines are well-known materials whose preparation is described in the chemical literature.

Any non-protonating Lewis acid can be used in accordance with this invention. By the term "Lewis acid" is meant an acid according to the Lewis definition. For a discussion of the Lewis definition of acids, see Hine, Physical Organic Chemistry, pp. 46–47 (1956), or Moeller, Inorganic Chemistry, pp. 326–329 (8th printing, 1959). Exemplary of the non-protonating Lewis acids are aluminum chloride, stannic chloride, boron chloride, boron fluoride, ferric chloride, antimony pentachloride, titanium tetrachloride, tellurium dichloride, tellurium tetrachloride, bismuth trichloride, zinc chloride, etc. In addition, mixtures of two or more of the above acids can be used.

Any type of hydrocarbon polymer, including saturated, unsaturated, linear, atactic, crystalline or nonlinear amorphous polymers as, for example, polyethylene, polypropylene, polystyrene, styrene-butadiene copolmers, isobutylene-isoprene copolymer, natural rubber, polybutadiene, polyisobutylene, ethylene-propylene copolymer, cis-1,4-polyisoprene, ethylene-propylene - dicyclopentadiene terpolymer, etc., and blends of these polymers with each other, can be cross-linked in accordance with this invention.

The cross-linking is carried out by merely mixing the hydrocarbon polymer, the aromatic polyazide and the non-protonating Lewis acid. Various amounts of aromatic polyazide and Lewis acid can be added, the optimum amount depending upon the amount of cross-linking desired, the specific aromatic polyazide employed, etc. In general, the amount of aromatic polyazide added, based on the weight of the polymer, will be from about 0.001% to about 30% and the amount of Lewis acid added will be sufficient to yield at least 1 mole equivalent of acid per azide.

It will be obvious to those skilled in the art that the cross-linking process of this invention lends itself to the preparation of cross-linked hydrocarbon polymer films and coatings. These films and coatings can be prepared and applied in various ways. One method which can be used is to spray separate streams of the reactants using a multi-nozzle spraying apparatus. Another method which can be used is curtain coating, where layers of the reactants are applied separately. Still another method which can be used is to contact a film of polymer containing polyazide with a gaseous Lewis acid such as boron fluoride. Where a solvent is used, care should be taken to select one possessing a relatively low reactivity to the cross-linking agents. Exemplary of these solvents are carbon tetrachloride, chloroform, ethylene dichloride, 1,3,5-trichlorobenzene, nitromethane, nitrobenzene, etc.

In addition to the cross-linking reagents, other ingredients can also be incorporated. Additives such as extenders, fillers, pigments, dyes, plasticizers, stabilizers, etc., can be used, but the presence or absence of such additives is immaterial to the invention.

The following examples are presented to illustrate the process of cross-linking polymers in accordance with this invention, parts and percentages being by weight unless otherwise specified. In the examples, the extent of cross-linking can be indicated by percent gain in insolubility in solvents in which the uncross-linked polymer was soluble, hereinafter termed "percent gel." Percent gel is determined as follows: A weighed sample of cross-linked polymer is soaked in a solvent, in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures $$\frac{\text{Corrected dry weight}}{\text{Corrected initial weight}} \times 100 = \text{percent gel}$$

The molecular weight of the polymers cross-linked in the examples can be indicated by their reduced specific viscosity (RSV). By the term "reduced specific viscosity" is meant the $\eta$sp./C. determined on an 0.1% solution (0.1 g. of the polymer per 100 ml. of solution) of the polymer at elevated temperature.

*Example 1*

This example demonstrates the cross-linking of an ethylene-propylene copolymer rubber containing 29 mole percent of propylene and having an RSV of 4.0 as determined in decahydronaphthalene at a temperature of 135° C. A solution was prepared containing 3.7 parts of copolymer in 159 parts of carbon tetrachloride. To 20 parts of the thus prepared solution was added 0.2 part of anhydrous aluminum chloride and 0.04 part of 4,4'-diphenyldiazide dissolved in 8 parts of carbon tetrachloride. The resulting mixture was vigorously agitated at room temperature under ordinary light conditions as a copious evolution of nitrogen occurred. Within three minutes a gel formed. The carbon tetrachloride solvent was evaporated and the resulting rubbery material thoroughly extracted with hot water to remove excess aluminum chloride. The resulting cross-linked ethylene-propylene copolymer was hard, tough, resilient and odorless. A sample of the vulcanizate was tested to determine the extent of cross-linking by extracting with an excess of toluene for 4 hours at a temperature of 80° C. It was found to have a gel value of 41%. A control sample of the original solution was treated in exactly the same way except the 4,4'-diphenyldiazide was omitted. The thus treated copolymer had a gel value of 0%.

*Example 2*

This example demonstrates the cross-linking of an ethylene-propylene copolymer containing 31 mole percent propylene and having an RSV of 1.9 as determined in decahydronaphthalene at 135° C. A solution was prepared containing 3.03 parts of copolymer in 159 parts of carbon tetrachloride. To this solution was added anhydrous aluminum chloride and 4,4'-diphenyldiazide exactly as described in Example 1. The vulcanizate was recovered and purified as described in Example 1 and was found to have a gel value of 54%.

*Example 3*

This example demonstrates the cross-linking of a styrene-butadiene copolymer rubber containing 23.5 percent styrene and having an average molecular weight of from 200,000 to 300,000. A solution was prepared containing 3.15 parts of copolymer in 159 parts of carbon tetrachloride. To this solution was added anhydrous aluminum chloride and 4,4'-diphenyldiazide exactly as described in Example 1. The vulcanizate was recovered and purified as described in Example 1 and was found to have a gel value of 45%.

*Example 4*

This example demonstrates the cross-linking of an amorphous polypropylene having an RSV of 0.78 as determined in decahydronaphthalene at a temperature of 135° C. A solution was prepared containing 1 part of polymer in 15 parts of chloroform. To 8 parts of the thus prepared solution was added 0.2 part of 4,4'-diphenyldiazide. After the diazide dissolved, 0.3 part of anhydrous aluminum chloride was added. The resulting mixture was vigorously agitated at room temperature under ordinary light conditions as a copious evolution of nitrogen occurred. Within several minutes a gel formed. The chloroform solvent was evaporated at room temperature and the resulting rubbery material extracted with hot 5% aqueous hydrochloric acid to remove excess aluminum chloride. The material was then washed with water and acetone. The resulting vulcanizate was resilient, hard, and substantially insoluble in hot toluene.

*Example 5*

This example demonstrates the cross-linking of the amorphous polypropylene described in Example 4. A solution was prepared containing 1 part of polymer and 15 parts of chloroform. To 8 parts of the thus prepared solution was added 0.2 part of 2,2'-dinitro-4,4'-diazidodiphenyl. After the diazidodiphenyl dissolved, 0.3 part of anhydrous antimony pentachloride was added. The resulting mixture was vigorously agitated at room temperature under ordinary light conditions as a copious evolution of nitrogen occurred. Within several minutes a gel formed. The chloroform solvent was evaporated at room temperature and the resulting rubbery material extracted and washed as described in Example 4. The resulting vulcanizate was hard, resilient, and substantially insoluble in hot toluene.

*Example 6*

This example demonstrates the cross-linking of the amorphous polypropylene described in Example 4. A solution was prepared containing 1 part of polymer and 16 parts of carbon tetrachloride. To 8.5 parts of the thus prepared solution was added 0.5 part of 4,4'-diphenylmethane diazide. After the diazide dissolved, 0.3 part of anhydrous antimony pentachloride was added. The resulting mixture was vigorously agitated at room temperature under ordinary light conditions, and within several minutes a gel formed. The carbon tetrachloride was evaporated at room temperature and the resulting rubbery material extracted and washed as described in Example 4. The resulting vulcanizate was hard, resilient, and substantially insoluble in hot toluene.

*Example 7*

This example demonstrates the preparation of a cross-linked film. Using a two-nozzle sprayer, two solutions were simultaneously sprayed on a glass plate. One of the solutions consisted of 3.15 parts of the amorphous polypropylene described in Example 4 and 0.3 part of 4,4'-diphenyldiazide in 150 parts of chloroform. The second solution consisted of 0.3 part of anhydrous aluminum chloride in 150 parts of chloroform. After allowing the film to set for 5 minutes, the solvent was removed by a stream of air at room temperature. The film was then washed with 5% aqueous hydrochloric acid and finally with water. The resulting film was hard, resilient, and substantially insoluble in hot toluene.

*Example 8*

This example demonstrates the preparation of a cross-linked film. A solution was prepared containing 3.7 parts of the ethylene-propylene copolymer described in Example 1 and 0.2 part of 4,4'-diphenyldiazide in 170 parts of carbon tetrachloride. From this solution a thin film was cast on a glass plate and the carbon tetrachloride solvent was allowed to evaporate at room temperature under ordinary light conditions. The resulting film was placed in an atmosphere of boron fluoride gas for 5 minutes at room temperature under ordinary light conditions, then washed with dilute hydrochloric acid and finally with water. The resulting film was hard, resilient, and substantially insoluble in hot toluene.

What I claim and desire to protect by Letters Patent is:
1. Process of cross-linking a hydrocarbon polymer which comprises treating said polymer with an aromatic polyazide having the formula $R(N_3)_x$ where R is an aromatic grouping inert to the cross-linking reaction and $x$ is an integer greater than 1 in the presence of a non-protonating Lewis acid.
2. Process of claim 1, wherein the hydrocarbon polymer is an ethylene-propylene copolymer.

3. Process of claim 1 wherein the hydrocarbon polymer is a polypropylene.

4. Process of claim 1 wherein the hydrocarbon polymer is a styrene-butadiene copolymer.

5. Process of claim 1 wherein the aromatic polyazide is 4,4′-diphenyldiazide.

6. Process of claim 1 wherein the aromatic polyazide is 2,2′-dinitro-4,4′-diazidodiphenyl.

7. Process of claim 1 wherein the aromatic polyazide is 4,4′-diphenylmethane diazide.

8. The process of claim 1 wherein the non-protonating Lewis acid is aluminum chloride.

9. The process of claim 1 wherein the nonprotonating Lewis acid is antimony pentachloride.

10. The process of claim 1 wherein the non-protonating Lewis acid is boron fluoride.

11. Process of cross-linking an ethylene-propylene copolymer comprising treating a carbon tetrachloride solution of said copolymer with 4,4′-diazidodiphenyl at room temperature in the presence of a small amount of aluminum chloride.

No references cited.

JOSEPH L. SCHOFER, *Primary Examiner.*